United States Patent [19]

Hsiung

[11] Patent Number: 5,688,562
[45] Date of Patent: Nov. 18, 1997

[54] METHOD FOR MODIFYING UNCOATED SYNTHETIC POLYMER FIBERS USING A LANGMUIR-BLODGETT FILM COATING PROCESS

[75] Inventor: Hui Hsiung, Hockessin, Del.

[73] Assignee: E. I. Du Pont de Nemours and Company, Wilmington, Del.

Related U.S. Application Data

[60] Provisional application No. 60/000,336 Jun. 20, 1995.

[21] Appl. No.: 648,746
[22] Filed: May 16, 1996
[51] Int. Cl.$^6$ ...................................... B05D 1/20
[52] U.S. Cl. ........................ 427/434.3; 427/434.6; 427/434.7
[58] Field of Search ............... 427/434.3, 434.6, 427/434.7; 118/402

[56] References Cited

U.S. PATENT DOCUMENTS

| | | | |
|---|---|---|---|
| 4,722,856 | 2/1988 | Albrecht et al. | 427/402 |
| 5,225,274 | 7/1993 | Ogawa et al. | 428/333 |

FOREIGN PATENT DOCUMENTS

| | | | |
|---|---|---|---|
| 60-193325 | 10/1985 | Japan | 118/423 |
| 1-162867 | 6/1989 | Japan . | |
| 3-70742 | 3/1991 | Japan . | |

OTHER PUBLICATIONS

McIntyre, J.E., *Encyclopedia of Polymer Science and Technology*, 8, 394, 1968 (no month date).

Reichert, W. M. et al., *Thin Solid Films*, 152, 345–376, 1987 (no month date).

Selfridge, R. H. et al., *Thin Solid Films*, 160, 471–476, 1988 (no month date).

Black, D. St. C. et al., *Aust. J. Chem.*, 25, 1797–1810, 1972 (no month date).

Bassiri, T. G. et al., *J. Polym. Sci. Polym. Lett.*, 5, 871, 1967 (no month date).

Sauer, B. B. et al., *Langmuir*, 6, 1002–1007, 1990 (no month date).

*Primary Examiner*—Katherine A. Bareford

[57] ABSTRACT

Method for modifying the surface properties of synthetic polymer fibers by coating the fibers with ultrathin organic monolayer films according to the Langmuir-Blodgett coating technique. The inventive method substantially reduces the amount of coating necessary to modify the surface properties of such fibers compared to conventional finishing techniques.

9 Claims, 2 Drawing Sheets

METHOD FOR MODIFYING UNCOATED SYNTHETIC POLYMER FIBERS USING A LANGMUIR-BLODGETT FILM COATING PROCESS

This application claims the priority benefit of U.S. Provisional application 60/000,336, filed Jun. 20, 1995.

FIELD OF THE INVENTION

A method is provided for modifying the surface properties of synthetic polymer fibers for fiber-processing and fiber-finishing applications by coating the fibers with ultrathin organic monolayers. In particular, a method is provided for modifying the surface properties of synthetic polymer fibers by applying a Langmuir-Blodgett film coating to the fiber surface.

BACKGROUND OF THE INVENTION

Synthetic polymer fibers are normally produced and used in aggregates of a number of single fibers that interact with each other through their surfaces. In common practice, fibers are surface treated as single filaments, then immediately combined with other single filaments to form a higher denier yarn. Therefore, the control of surface properties of fibers during their manufacture is of prime importance.

The control of surface properties is typically accomplished by applying finishes to fiber surfaces at various manufacturing stages. Finishes are usually organic fluids consisting of one or more components that provide lubrication and antistatic functions, and are usually applied as a solution or an emulsion in water. Typical components include hydrocarbon oils, long-chain aliphatic esters, polyoxyethylene condensates attached to $C_8$-$C_{18}$ aliphatic chains, long-chain alkyl quaternary ammonium salts, hydroxyalkylamine salts of fatty acids, and fluid silicones. [see, e.g., J. E. McIntyre, *Encyclopedia of Polymer Science and Technology*, Vol. 8, eds. H. F. Mark and N. G. Gaylord, John Wiley & Sons, Inc., New York (1968) p. 394.] After evaporation of the solvent, the concentration of finish on the fiber is usually in the range of 0.3–1 wt. %.

In many cases, the finishes are later removed from the fibers; in other cases finishes may be used to achieve durable surface properties (such as water repellency, stain resistance, or coloration) in the final fiber product. Although finishes are indispensable components in conventional fiber manufacturing, large amounts of waste are also generated from and by such finishes. This has become an increasingly environmental, as well as economical, concern facing the fiber industry.

Many surface properties—such as wettability, static, friction and cohesion—are believed to be controlled by the outermost molecular layers of the fiber. This is why such properties can be changed by coating the fiber with a finishing layer consisting of even a single molecular layer. To achieve desirable surface properties of fibers, it is therefore possible to use a significantly lesser amount of finishing materials than that used in conventional finishing methods which normally produce thick and non-uniform finishing coatings on fibers, if the finishing layer remains attached to the filament.

On a flat solid surface, the Langmuir-Blodgett coating method can produce a uniform organic film of thickness in the nanometer range. [see, A. Ulman, *An Introduction to Ultrathin Organic Films from Langmuir-Blodgett to Self-Assembly*, Academic Press Inc., San Diego (1991), Part 2.] According to the Langmuir-Blodgett method, a monolayer film of an organic compound (coating substance) is initially prepared on a water surface. This is achieved by spreading a small amount of a volatile solution of that compound on the water surface to form a loosely packed monolayer and, after evaporation of the solvent, by compressing the monolayer to produce a uniform film. In a standard arrangement, monolayer compression is accomplished by a moving barrier at the water surface. An alternate approach utilizes a continuous laminar flow (water flowing parallel to its surface) to compress the monolayer, which allows significantly faster coating of Langmuir-Blodgett films on substrates. [see, U.S. Pat. No. 4,722,856 (Albrecht et al.).]

When a proper substrate (usually a thin slide of an inorganic solid, such as glass) is passed through the monolayer-clad water surface, a part of the monolayer film is transferred to the substrate surface, forming a uniform monolayer coating thereon. The process can be repeated in order to obtain a desirable multilayer coating, with its total thickness controlled to within a monolayer unit.

Normally, a coating compound must be insoluble in water, as well as amphiphilic—containing both a hydrophilic (water-loving) terminal group and a hydrophobic (water-loathing) group at the opposite end. Such a compound can form a monolayer on a water surface with the hydrophilic group attracted to the water and the hydrophobic group repelled away from the water. Typical examples of such monolayer-forming compounds include various salts of the fatty acid series, $CH_3(CH_2)_n COOH$ ($n \geq 13$), where the carboxylic acid group is hydrophilic and the alkyl chain is hydrophobic. "Comb" polymers, with a hydrophilic backbone and with side chains terminated by a hydrophobic group, are also good candidates for forming Langmuir-Blodgett films. A coating comprising a mixture of different compounds within each monolayer, or successive monolayers of different compounds, can be prepared.

Coating Langmuir-Blodgett films on fiber-shaped articles has been reported in the literature. In most cases, glass optical fibers were used, and the Langmuir-Blodgett coating was used as a molecular sensing element [see, e.g., W. M. Reichert, C. J. Bruckner, and J. Joseph, *Thin Solid Films* 152 (1987) 345–376] or as an active optical element [see, e.g., R. H. Selfridge, S. T. Kowel, P. Stroeve, J. Y. S. Lam, and B. G. Higgins, *Thin Solid Films* 160 (1988) 471–476]. In one report, a Langmuir-Blodgett film was coated onto a polymeric fiber. (see, K. Terada [Japanese Patent JP 3-70,742 (1991)]). However, this report describes a cylindrical membrane structure used for selective gas separation, which was prepared by coating a Langmuir-Blodgett film onto a porous hollow fiber of polysulfone or polyacrylonitrile.

Clearly, what is needed is a method of modifying the surface properties of synthetic polymer fibers wherein smaller quantities of finishing substances are required compared to conventional methods. As a result, it is an object of the present invention to provide a method for modifying the surface properties of synthetic polymer fibers that overcomes the problems and deficiencies of the prior art. Other objects and advantages of the present invention will become apparent to those skilled in the art upon reference to the attached drawings and to the detailed description of the invention which hereinafter follows.

SUMMARY OF THE INVENTION

The present invention provides an unconventional method for modifying the surface properties of synthetic polymer fibers for fiber-processing and fiber-finishing applications. The method requires finishing substances measuring many orders of magnitude smaller in quantity than those used in conventional finishing methods, therefore substantially eliminating the need to dispose of excess finishing substance after fiber treatment has occurred.

The inventive method is based on the application of the Langmuir-Blodgett coating technique to finish synthetic polymer fibers with liquid-insoluble amphiphilic compounds and polymers. Each time a section of a fiber passes through a Langmuir-Blodgett coating surface, a monolayer film is coated onto the fiber surface. The process is repeatable such that any desirable number of monolayers (of similar or different coating substances) may be coated onto the fiber surface. Many surface properties of fibers can be significantly modified even with a single-monolayer coating.

Accordingly, a method is provided for modifying the surface properties of synthetic polymer fibers comprising applying a Langmuir-Blodgett film coating to an unfinished synthetic polymer fiber by passing said fiber through a liquid-insoluble Langmuir-Blodgett film material that is positioned on the surface of a liquid such that a monolayer film coating of said Langmuir-Blodgett film material is deposited on the surface of said fiber following said passing step.

DETAILED DESCRIPTION OF THE PREFERRED EMBODIMENTS

Figure 1:
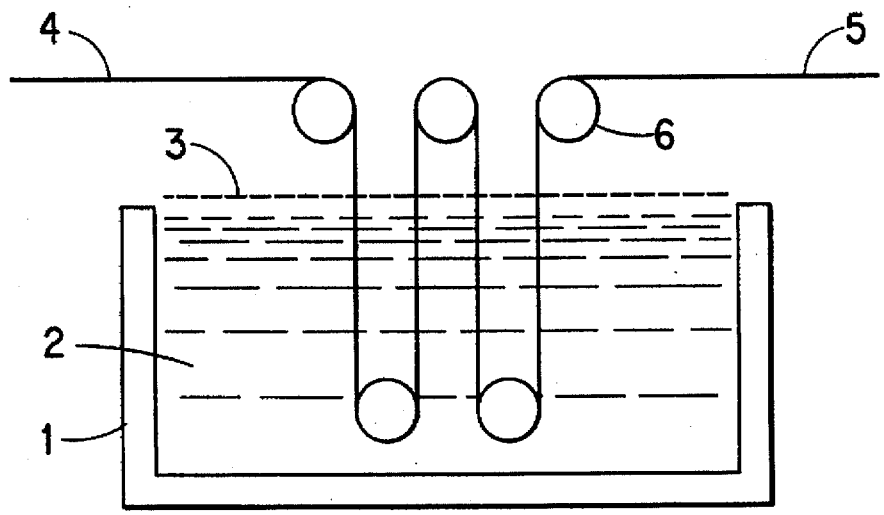
FIG. 1 is a schematic side view of one embodiment of the present invention wherein a continuously running fiber is guided to pass, in a vertical orientation, through a monolayer-clad water surface a number of times.
Figure 2:
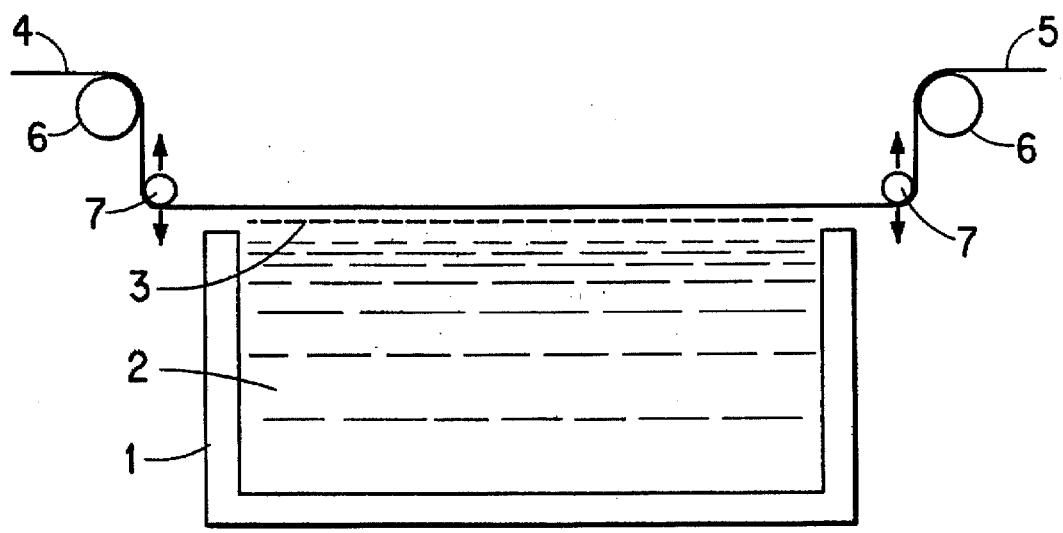
FIG. 2 is a schematic side view of another embodiment of the present invention wherein a continuously running fiber is directed up-and-down by oscillating guides such that it can repetitively pass, in a horizontal orientation, through a monolayer-clad water surface.

The present invention provides for at least two coating schemes for finishing continuously moving fibers commonly found in fiber manufacturing, as depicted in FIG. 1 and FIG. 2. In FIG. 1, coating occurs at each point where the fiber passes in a vertical orientation through the monolayer-clad water surface. In FIG. 2, coating occurs over an entire fiber segment as it passes in a horizontal orientation through the monolayer-clad water surface. In both schemes, the number of monolayers coated onto the fiber is determined by the combination of the number of fiber passes through the water surface and the running speed of the fiber.

Figure 3:
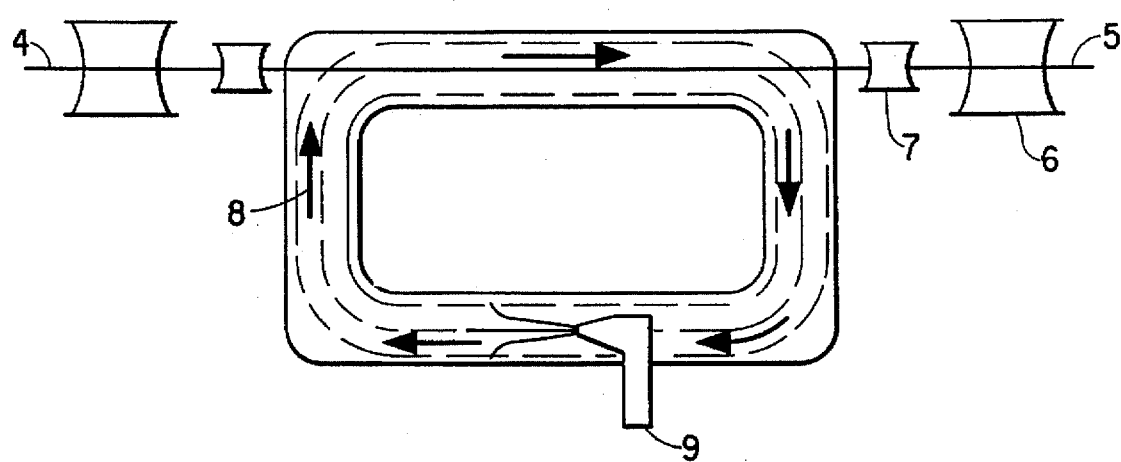
FIG. 3 is a schematic top view of an embodiment of the present invention, which may be incorporated in either scheme shown in FIG. 1 or FIG. 2, wherein the water is continuously circulated in a loop, forming a laminar flow to transport, compress, and recycle the monolayer on the water surface.

Referring to either scheme shown in FIG. 1 or FIG. 2, the fiber-finishing system comprises a trough 1, preferably coated with a Teflon layer to render it hydrophobic, filled with liquid 2 (preferably water) such that the liquid surface is slightly (one to several millimeters) above the trough's rim. A monolayer film 3 of a finishing substance is prepared by first spreading and then compressing the insoluble substance on the liquid surface. The monolayer compression is carried out with a moving surface barrier (not shown) or with a laminar flow in the liquid; the latter being preferred. A fiber-finishing system incorporating a continuous laminar flow 8 is depicted in FIG. 3, where the monolayer is constantly replenished by addition of the finishing material 9 and by recycling of the unused monolayer.

In FIG. 1, the incoming fiber 4 is directed by a series of guides 6 such that the fiber passes in a vertical orientation through the monolayer film 3 for a number of times. In this arrangement, the number of monolayers coated on the outgoing fiber 5 is determined by the number of the fiber guides 6. In FIG. 2, the coating is carried out with the fiber passing in a horizontal orientation through the monolayer-clad liquid surface. This is dictated by the vertical movement of a pair of oscillating guides 7. Here, the number of monolayers being coated onto the fiber is determined by the number of times a fiber segment passes through the liquid surface, which in turn is controlled by the combination of oscillation frequency of guides 7 and the running speed of the fiber.

A general requirement for any fiber-finishing substance usable in the present invention is its capability of forming a monolayer film at the air-liquid interface. This requirement is satisfied by many known liquid-insoluble (e.g., water-insoluble) amphiphilic compounds and polymers; examples are given by A. Ulman, *An Introduction to Ultrathin Organic Films from Langmuir-Blodgett to Self-Assembly*, Academic Press Inc., San Diego (1991), Part 2, the entire contents of which are incorporated herein.

In addition, the finishing substance must contain functional groups that can provide desirable surface properties to the fiber such as water repellency, lubrication and antistatic effects. Since long-chain hydrocarbons have been widely used as major ingredients of lubricants, and many monolayer-forming amphiphilic compounds contain at least one long hydrocarbon chain as their hydrophobic group, these compounds may provide lubrication. For example, various salts of stearic acid widely used for Langmuir-Blodgett coatings are also common fiber lubricants.

Antistatic agents normally contain hydrophilic groups, preferably ionic, in order to impart hygroscopicity or to supply mobile ions. Many of such functional groups can be found in compounds forming Langmuir-Blodgett films. Alkyl quaternary ammonium salts, alkyl phosphates, and alkyl amines are a few suitable examples. See, A. Ulman, *An Introduction to Ultrathin Organic Films from Langmuir-Blodgett to Self-Assembly*, Academic Press Inc., San Diego (1991), Part 2.

In achieving lubrication or antistatic effects, the molecular packing density in Langmuir-Blodgett coatings on fibers is another important factor to consider. It is desirable that molecules in a finishing coating do not pack tightly to allow motions of the hydrocarbon chains (for lubrication) and to allow penetration and retention of water molecules (for antistatic functions). In many aspects, polymers may be more suitable than monomeric compounds as finishing substances for the present invention. For forming Langmuir-Blodgett films, polymers are less contingent to the conventional criterion of amphiphilicity, thus allowing more flexibility in developing new finishes. Furthermore, Langmuir-Blodgett monolayers of some polymers are "liquid-like" rather than crystalline. Such polymers are good candidates as lubricating or antistatic fiber finishes. Compared to monomeric compounds, polymer molecules often exhibit better adhesion to a fiber surface and among themselves, they tend to cause little diffusion into the fiber—both are desirable properties for a durable fiber finishing.

Appropriate finishing substances compatible with this invention include water-insoluble amphiphilic compounds and polymers. These include, but are not limited to, salts of the fatty acid series, $CH_3(CH_2)_nCOOH$ ($n \geq 13$), and long-chain alkyl quaternary ammonium salts. The invention further provides that poly(2-oxazolines), or poly(N-acylethyleneimines), that contain either a hydrocarbon or a fluorocarbon side group, are suitable finishing substances; those containing fluorocarbon groups can provide water repellency, among other surface properties, to fibers.

Suitable synthetic polymer fibers for application of the present invention include, but are not limited to, nylon (polyamides) and spandex (segmented polyester-polyurethanes) fibers. Other synthetic polymer fibers commercially manufactured will also benefit from the present invention.

A class of polymer particularly suitable for the present invention is poly(2-oxazoline) [or poly(N-acylethyleneimine)], with the generic structure:

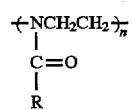

where n is an integer of at least 3, and R contains linear, branched, or cyclic hydrocarbon or fluorocarbon groups. Specific examples are given below. When R is terminated by a hydrophobic perfluorocarbon group, highly water-repellent fiber finishing can be obtained with the present invention.

The following examples illustrate the present invention, but are not intended to limit it in any way. EXAMPLES 1 and 2 describe the preparation and properties of two poly(2-oxazolines) used to demonstrate the Langmuir-Blodgett method of coating synthetic polymer fiber surfaces. EXAMPLES 3 to 6 describe the preparation and characterization of synthetic polymer fibers coated by the Langmuir-Blodgett method.

EXAMPLE 1

Preparation of Poly(2-(4-(1-oxy-1-trifluoromethyl-2, 2-diheptafluoroisopropylethylene)phenyl)-2-oxazoline)

(a) Preparation of the Monomer

A solution of 2-(p-hydroxyphenyl)-2-oxazoline [prepared by the method described by D. St. C. Black and M. J. Wade in *Aust. J. Chem.* 25 (1972) 1797–1810, for 2-(o-hydroxyphenyl)-2-oxazoline] (4.89 g, 0.03 mol) and hexafluoropropene trimer (14.85 g, 0.033 mol) in 80 ml of dimethylformamide and 3 ml trichlorotrifluoroethane was cooled to 15° C. under a nitrogen atmosphere. To this solution, 1,4-diazabicyclo[2.2.2]octane (4.04 g, 0.036 mol) in 40 ml dimethylformamide was added dropwise over a ½ hr period. The reaction mixture was allowed to warm up to room temperature during the addition, and it was stirred at this temperature for 40 hrs. Then it was poured into 120 ml of ice water; sodium chloride was added and it was extracted with three 75 ml portions of ethyl ether. The ether extracts were dried over magnesium sulfate and, after evaporation of the solvent, a clear oil which solidified upon standing at room temperature was obtained. After two Kugelrohr distillations (120°–128° C. at ~0.1 mmHg), 7.72 g of a white solid with mp 90°–91° C. was obtained. $^1$H NMR (CDCl$_3$, TMS δ ppm): 7.99 (d, 2 aromatic H); 6.95 (d, 2 aromatic H); 4.45 (t, OCH$_2$); 4.07 (t, NCH$_2$). $^{19}$F NMR (CDCl$_3$, F11 δ ppm): −56.70 (d, 3F); −71.40 (s, 6F); −72.51 (d, 6F); −167.69 (q, 1F); −169.64 (m, 1F).

| Elemental Analysis for $C_{15}H_8F_{17}NO_2$: | | | | |
|---|---|---|---|---|
| | % C | % H | % N | % F |
| Calculated | 36.44 | 1.36 | 2.36 | 54.44 |
| Found | 36.22 | 1.25 | 2.50 | 54.85 |

(b) Preparation of the Polymer 1 g of 2-(4-(1-oxy-1-trifluoromethyl-2,2-diheptafluoroisopropylethylene)-phenyl)-2-oxazoline and 0.0057 g of initiator (N-methyl 2-perfluorooctylethyl-2-oxazolinium triflate) were placed into a 50 ml round-bottom flask equipped with a magnetic stirrer. The flask was evacuated, filled with argon, and kept under slight argon pressure. It was heated to 130° C. in an oil bath; after one hour, the polymer became too viscous to stir. The temperature was raised to 150° C.; when the reaction mixture completely became a white solid, it was dissolved in hexafluoroisopropanol and precipitated into methanol. The white powder obtained was filtered and dried under vacuum at 55° C. The yield was 0.87 g. GPC (HFIP, PET std.): $M_n$=9,560, $M_w$=13,100; DSC: $T_g$=120° C.

(c) Monolayers at the Air-Water Interface and Langmuir-Blodgett Films

This polymer formed a very stable condensed monolayer at the air-water interface, with a collapse pressure of about 50 mN/m and an average molecular area per polymer repeat unit of approximately 0.43 nm$^2$ at the collapse point. The monolayers were transferred onto solid substrates to make multilayer Langmuir-Blodgett films. The monolayer thickness of these films was 1.3 nm.

EXAMPLE 2

Preparation of Poly(2-alkyl-2-oxazoline)

(a) Preparation of the Monomer

2-Alkyl-2-oxazoline monomers were prepared according to literature procedures: H. Witte and W. Seeliger, *Liebigs Ann. Chem.* (1974) 996; T. G. Bassiri, A. Levy, and M. Litt, *J. Polym. Sci., Polym. Lett.* Ed. 5 (1967) 871.

(b) Preparation of the Polymer

2-Alkyl-2-oxazoline monomers were polymerized in bulk under an argon atmosphere using N-methyl-2-methyl-2-oxazolinium triflate as an initiator at temperatures between 80° and 130° C. Monomer to initiator ratios varied from 100/1 to 500/1. Conversion to polymer was almost quantitative in every case. Table 1 lists the the polymers prepared, along with their molecular weights and melting points. All the polymers were of moderate molecular weights, and their melting temperatures agree with those reported in the literature. [T. G. Bassiri, A. Levy, and M. Litt, *J. Polym. Sci., Polym. Lett.* Ed. 5 (1967) 871]

(c) Monolayers at the Air-Water Interface and Langmuir-Blodgett Films

All poly(2-alkyl-2-oxazolines) prepared formed stable monolayers at the air-water interface. The behavior of these monolayers depended strongly on the length of the alkyl side chain. With a shorter alkyl chain ($C_6$–$C_{11}$), the polymer formed a liquid-like monolayer in which all segments of the backbone were adjacent to the water surface and the alkyl chains were in contact with the air—but not closely packed. Due to stronger hydrophobic interactions among the alkyl chains, those polymers with longer alkyl chains ($C_{12}$ and $C_{13}$) formed solid-like monolayers at high surface pressures. The polymers with even longer alkyl chains ($C_{14}$ and above) formed only rigid solid monolayers which had a tendency to crystallize when compressed.

Uniform multilayer Langmuir-Blodgett films of each of the $C_6$–$C_{12}$ polymers were deposited easily at any surface pressure below the collapse point. Although monolayer films of the $C_{13}$–$C_{17}$ polymers could be deposited with ease, preparation of multilayer films using these polymers was difficult. The monolayer thickness of these Langmuir-Blodgett films is listed in Table 1.

TABLE 1

Characterization of Poly(2-alkyl-2-oxazolines)

| Alkyl Chain | Mw[a] | Mn[a] | Mw/Mn[a] | Tm (°C.)[b] | Monolayer Thickness (nm) |
|---|---|---|---|---|---|
| $C_6H_{13}$ | 44,000 | 32,800 | 1.3 | 161 | 10 |
| $C_8H_{17}$ | 48,300 | 35,000 | 1.4 | 156 | 13 |
| $C_{10}H_{21}$ | 48,400 | 19,100 | 2.5 | 151 | 16 |
| $C_{11}H_{23}$ | 68,400 | 34,900 | 2.0 | 152 | 18 |
| $C_{12}H_{25}$ | 74,400 | 36,700 | 2.0 | 145 | 20 |
| $C_{13}H_{27}$ | 45,600 | 19,600 | 2.3 | 146 | 26 |
| $C_{14}H_{29}$ | 49,700 | 25,500 | 1.9 | 139 | 13 |
| $C_{17}H_{35}$ | 48,400 | 31,900 | 1.5 | 133 | 18 |

[a]By GPC in THF against PS standards
[b]By DSC at 10° C./min.

EXAMPLE 3

Nylon Fibers (Vertical Orientation) Coated with Langmuir-Blodgett Films of Poly(2-(4-(1-oxy-1-trifluoromethyl-2,2-diheptafluoroiso-propylethylene)phenyl)-2-oxazoline)

(a) Nylon Fibers

The nylon fibers used in this example were unfinished, unbulked carpet fibers of nylon 6,6, commercially available from E. I. du Pont de Nemours and Company, Wilmington, Del. The fibers were monofilament fibers having a round cross-section measuring 40–50 µm in diameter. The fibers' linear density was 1150 denier, corresponding to 128 g/km.

(b) Preparation of Langmuir-Blodgett Coatings

For coating Langmuir-Blodgett films onto fibers, a commercial apparatus (Lauda Film Balance with Filmlift FL-1) was modified to mimic the fiber-coating scheme shown in FIG. 1. The fiber guides were made of Teflon (PTFE) rods. The coating system included a trough filled with purified water (distilled and deionized). The monolayers were prepared the usual way: An adequate amount of a dilute polymer solution (typically 1.0 mg/ml in 95% trichlorotrifluoroethane and 5% hexafluoroisopropanol) was first spread on the water surface to form a low-density monolayer. After evaporation of the solvent, the monolayer was compressed by a moving barrier to a desirable surface pressure, which was kept constant by the barrier during the entire coating process. In this example, a monolayer of poly(2-(4-(1-oxy-1-trifluoromethyl-2,2-diheptafluoroisopropyl-ethylene)phenyl)-2-oxazoline) was maintained under a surface pressure of 35 mN/m, corresponding to an average surface area of 0.45 nm² for each polymer repeat unit. Since the bare nylon-fiber surface was hydrophilic, the first entry of the fiber into water resulted in no film deposition, but each subsequent passage through the monolayer-clad water surface caused the deposition of a monolayer onto the fiber surface. Limited by the modified apparatus, the fiber moving speed was between 0–5 cm/min.

(c) Characterization with Dynamic Contact Angles

The coated fibers were characterized by measurements of their dynamic contact angles as described by B. B. Sauer and T. E. Carney, Langmuir 6 (1990) 1002–1007. Advancing contact angles (measured when a fiber was moving vertically into pure water) and receding contact angles (measured when a fiber was moving vertically out of pure water) for fibers coated with Langmuir Blodgett films of various thickness are listed in Table 2. The dynamic contact angles represent the wettability (water repellency) of the coated fibers; they are also used here to evaluate the coating quality. Table 2 was obtained for the Langmuir-Blodgett coating carried out at a fiber-moving speed of 0.5 cm/min. However, similar results were obtained for a speed of 5 cm/min, the maximum attainable speed of the apparatus. Each contact-angle value listed in Table 2 was an average over measurements of a number of fiber segments; its uncertainty is represented by the standard deviation following each value.

From Table 2 it can be seen that most increases in the contact angles occurred after the coating of the first monolayer, and the contact angles reached their maximum values (averaging 117.0 deg. and 74.4 deg., respectively for advancing and receding angles) after the third monolayer. As expected, nylon fibers coated with the fluorocarbon polymer became significantly more hydrophobic than the uncoated ones.

The amount of coating substance used was minute compared to that of the conventional finishing. For example, about 7 µg of the polymer was sufficient to coat a monolayer film onto a kilometer of the fiber. In comparison, 0.4–1.3 g/km of finish would be required for a typical (0.3–1 wt. %) finish-to-fiber weight ratio. This represents a significant reduction in the amount of the finishing material by about five orders of magnitude.

TABLE 2

Dynamic Contact Angles of Nylon 6,6 Fibers (Vertical Orientation) Coated with Poly(2-(4-(1-oxy-1-trifluoromethyl-2,2-diheptafluoroisopropylethylene)phenyl)-2-oxazoline)

| Number of Coated Monolayers* | Advancing Contact Angle (deg.) | Receding Contact Angle (deg.) |
|---|---|---|
| 0 | 62.6 ± 1.3 | 37.4 ± 1.9 |
| 1 | 97.0 ± 8.8 | 55.0 ± 8.0 |
| 3 | 116.8 ± 4.8 | 75.0 ± 3.5 |
| 5 | 116.8 ± 4.1 | 73.2 ± 2.7 |
| 7 | 113.3 ± 3.7 | 73.4 ± 2.3 |
| 9 | 115.9 ± 6.1 | 74.9 ± 1.7 |
| 11 | 120.8 ± 0.6 | 75.3 ± 2.0 |
| 13 | 117.8 ± 4.3 | 72.7 ± 1.3 |
| 15 | 118.7 ± 2.2 | 76.2 ± 0.9 |
| 19 | 115.6 ± 3.6 | 74.4 ± 0.5 |

*The thickness of each monolayer is 1.3 nm

EXAMPLE 4

Nylon Fibers (Horizontal Orientation) Coated with Langmuir-Blodgett Films of Poly(2-(4-(1-oxy-1-trifluoromethyl-2,2-diheptafluoroiso-propylethylene)phenyl)-2-oxazoline)

The nylon fibers and the coating polymer used in this example were the same as that used in EXAMPLE 3. The same Langmuir-Blodgett apparatus (Lauda Film Balance with Filmlift FL-1) was modified to mimic the fiber-coating scheme shown in FIG. 2, except that a fixed (rather than continuously running) horizontal fiber segment was used. While maintaining its horizontal orientation, the entire fiber segment was translated in up-and-down motions through the monolayer-clad water surface during the coating process. Although the dipping/withdrawing speed was limited by the present apparatus to between 0–5 cm/min, the monolayer transfers over the entire fiber segment actually occurred during the short periods for the fiber cross section (40–50 μm in diameter) passing through the air-water interface. This corresponds to only 0.05–0.06 seconds at the maximum dipping/withdrawing speed (5 cm/min). Therefore, by increasing the length of the horizontal fiber segment and by minimizing the dipping/withdrawing distance, the scheme depicted in FIG. 2 should lead to substantially faster coating than that depicted in FIG. 1.

Table 3 lists the dynamic contact angles of nylon fibers coated with Langmuir-Blodgett films of various thickness, with the coating carried out in the horizontal geometry and at a dipping/withdrawing speed of 0.5 cm/min. It is seen from Table 3 that most increases in the contact angles occurred after the coating of the third monolayer, and the contact angles reached their maximum values after the fifth monolayer. Although the coverage of each monolayer coating appeared slightly less than that obtained in EXAMPLE 3, the same contact angles were achieved with the coating of two extra monolayers.

Furthermore, the coating quality was found to depend on the dipping/withdrawing speed. This is illustrated with Table 4, where the contact angles of fibers coated with five monolayers under different dipping/withdrawing speeds (up to 5 cm/min, the maximum attainable speed of the apparatus) are compared. It can be seen in Table 4 that the coating quality started to deteriorate at the maximum speed. Therefore, in designing a practical fiber-finishing system, the coating thickness and coating speed are two essential counter-balancing parameters to be considered.

TABLE 3

Dynamic Contact Angles of Nylon 6,6 Fibers (Horizontal Orientation) Coated with Poly(2-(4-(1-oxy-1-trifluoromethyl-2,2-diheptafluoroisopropylethylene)phenyl)-2-oxazoline)

| Number of Coated Monolayers* | Advancing Contact Angle (deg.) | Receding Contact Angle (deg.) |
| --- | --- | --- |
| 0 | 62.6 ± 1.3 | 37.4 ± 1.9 |
| 1 | 72.1 ± 3.9 | 37.6 ± 7.4 |
| 3 | 100.2 ± 3.1 | 51.4 ± 8.2 |
| 5 | 113.5 ± 5.1 | 75.7 ± 1.7 |
| 7 | 116.0 ± 3.7 | 73.0 ± 2.4 |
| 9 | 119.4 ± 1.1 | 72.2 ± 1.8 |
| 11 | 126.4 ± 1.7 | 75.5 ± 4.1 |

*The thickness of each monolayer is 1.3 nm

TABLE 4

Dynamic Contact Angles of Nylon 6,6 Fibers Coated with Five Monolayers of Poly(2-(4-(1-oxy-1-trifluoromethyl-2,2-diheptafluoroisopropylethylene)phenyl)-2-oxazoline)

| Dipping/Withdrawing Speed (cm/min) | Advancing Contact Angle (deg.) | Receding Contact Angle (deg.) |
| --- | --- | --- |
| 0.5 | 115.5 ± 9.7 | 72.2 ± 5.0 |
| 2.5 | 116.2 ± 5.8 | 75.7 ± 8.4 |
| 3.75 | 118.1 ± 2.5 | 78.2 ± 2.0 |
| 5.0 | 98.9 ± 3.5 | 59.0 ± 2.8 |

EXAMPLE 5

Nylon Fibers Coated with Langmuir-Blodgett Films of Poly(2-undecyl-2-oxazoline)

Except for the coating polymer, the present example used the same nylon fibers and the same experimental arrangement as in EXAMPLE 3. Poly(2-undecyl-2-oxazoline), which contains a $C_{11}H_{23}$ (rather than fluorinated) side chain, was used here, with chloroform as the monolayer-spreading solvent. The Langmuir-Blodgett coating was carried out at a surface pressure of 30 mN/m, corresponding to an average surface area of 0.23 $nm^2$ for each polymer repeat unit.

Table 5 lists the dynamic contact angles of nylon fibers coated with Langmuir-Blodgett films of various thickness, with the coating carried out in the vertical geometry and at a fiber-moving speed of 0.5 cm/min. It is seen from Table 5 that most increases in the contact angles occurred after the coating of the first monolayer, and the contact angles reached their maximum values (averaging 100.6 deg. and 62.7 deg., respectively for advancing and receding angles) after the third monolayer.

TABLE 5

Dynamic Contact Angles of Nylon 6,6 Fibers Coated with Poly(2-undecyl-2-oxazoline)

| Number of Coated Monolayers* | Advancing Contact Angle (deg.) | Receding Contact Angle (deg.) |
| --- | --- | --- |
| 0 | 62.6 ± 1.3 | 37.4 ± 1.9 |
| 1 | 93.5 ± 0.8 | 52.2 ± 0.7 |
| 3 | 96.9 ± 2.3 | 63.3 ± 1.9 |
| 5 | 104.5 ± 1.0 | 63.8 ± 0.8 |
| 7 | 100.3 ± 4.3 | 60.9 ± 4.2 |

*The thickness of each monolayer is 1.8 nm

EXAMPLE 6

Spandex Fibers Coated with Langmuir-Blodgett Films of Poly(2-(4-(1-oxy-1-trifluoromethyl-2,2-diheptafluoroiso -propylethylene)phenyl)-2-oxazoline)

Except for the fibers, the present example used the same coating polymer and the same experimental arrangement as in EXAMPLE 3. Here, a spandex fiber—Lycra®, manufactured and commercially available from E. I. du Pont de Nemours and Company, Wilmington, Del., was used. Lycra® fibers are made of segmented polyester-polyurethane copolymer comprising alternating soft and hard molecular segments. The Lycra® fibers used in this example contained 85% (by weight) soft segments and 15% hard segments. The fibers consisted of four fiber filaments mostly parallel to one another. The individual filaments exhibited approximately a round cross-section measuring about 35 μm in diameter. When received, the fibers contained finishes which were removed (by soaking in cyclohexane followed by drying at room temperature) before use.

To qualitatively demonstrate the effectiveness of the Langmuir-Blodgett coating, only an effective value for the advancing contact angle was deduced from the measurements. This was based on a simplification in the data analysis that treated the fiber as having a round cross-section. The results are shown in Table 6 where it was found that, at least for its wetting property, the fiber surface was effectively modified even by the coating of a single monolayer.

TABLE 6

Dynamic Contact Angles of Lycra ® Fibers Coated
with Poly(2-(4-(1-oxy-1-trifluoromethyl-2,2-diheptafluoro-
isopropylethylene)phenyl)-2-oxazoline)

| Number of Coated Monlayers* | Advancing Contact Angle (deg.) |
|---|---|
| 0 | 67.8 ± 4.7 |
| 1 | 93.3 ± 1.0 |
| 3 | 93.5 ± 1.0 |
| 5 | 92.2 ± 0.8 |
| 7 | 95.8 ± 3.7 |
| 41 | 99.6 ± 2.3 |

*The thickness of each monolayer is 1.3 nm

Although particular embodiments of the present invention have been described in the foregoing description, it will be understood by those skilled in the art that the invention is capable of numerous modifications, substitutions and rearrangements without departing from the spirit or essential attributes of the invention. Reference should be made to the appended claims, rather than to the foregoing specification, as indicating the scope of the invention.

What is claimed is:

1. A method for modifying an uncoated synthetic polymer fiber comprising applying a Langmuir-Blodgett film coating consisting of a water-insoluble amphiphilic polymer, said water-insoluble polymer selected from the group consisting of poly(2-oxazolines) and poly(N-acylethyleneimines), to an uncoated synthetic polymer fiber by passing said fiber through a water-insoluble Langmuir-Blodgett film material that is positioned on a surface of water such that a monomolecular layer film coating of said Langmuir-Blodgett film material is deposited on a surface of said fiber by said passing step.

2. The method of claim 1 wherein the fiber is passed through the film material a plurality of times in order to coat multiple monomolecular layers onto the surface of the fiber.

3. The method of claims 1 or 2 wherein the application takes place continuously.

4. The method of claim 3 wherein said fiber is guided to pass through the Langmuir-Blodgett film coating in a vertical orientation.

5. The method of claim 3 wherein said fiber is guided to pass through the Langmuir-Blodgett film coating in a horizontal orientation.

6. The method of claim 3 wherein the liquid is continuously circulated in a loop, forming a laminar flow to transport, compress and recycle the Langmuir-Blodgett film material on the water surface.

7. The method of claim 1 wherein the fiber is selected from the group consisting of nylon and spandex fibers.

8. The method of claim 1 wherein the poly(2-oxazoline) is poly(2-(4-(1-oxy-1-trifluoromethyl-2,2-diphetafluoroisopropylethylene)phenyl)-2-oxazoline); poly (2-alkyl-2-oxazoline); or poly(2-undecyl-2-oxazoline).

9. The method of claim 1 wherein the poly(2-oxazolines) and poly(N-acylethyleneimines) contain at least one hydrocarbon or fluorocarbon side group.

* * * * *